(12) United States Patent
Yu et al.

(10) Patent No.: US 12,209,674 B2
(45) Date of Patent: Jan. 28, 2025

(54) DIFFERENTIAL PRESSURE DRIVEN BURST-PIPELINE EMERGENCY BLOCKING SYSTEM

(71) Applicant: Sichuan Hejia Industrial (Group) Co., Ltd., Sichuan (CN)

(72) Inventors: Chao Yu, Sichuan (CN); Xiaoping Qiu, Sichuan (CN); Jian Lu, Sichuan (CN); Xiaojun Zheng, Sichuan (CN); Dong Wen, Sichuan (CN)

(73) Assignee: SICHUAN HEJIA INDUSTRIAL (GROUP) CO., LTD., Sichuan (CN)

( * ) Notice: Subject to any disclaimer, the term of this patent is extended or adjusted under 35 U.S.C. 154(b) by 0 days.

(21) Appl. No.: 18/167,394

(22) Filed: Feb. 10, 2023

(65) Prior Publication Data

US 2023/0392700 A1 Dec. 7, 2023

(30) Foreign Application Priority Data

Jun. 7, 2022 (CN) .......................... 202210632345.3

(51) Int. Cl.
*F16K 17/04* (2006.01)
*F16K 37/00* (2006.01)

(52) U.S. Cl.
CPC ...... *F16K 17/0413* (2013.01); *F16K 17/0473* (2013.01); *F16K 37/005* (2013.01); *F16K 37/0041* (2013.01)

(58) Field of Classification Search
None
See application file for complete search history.

(56) References Cited

U.S. PATENT DOCUMENTS

| 1,700,111 | A | * | 1/1920 | Welcker | F16K 1/126 |
| | | | | | 137/460 |
| 1,956,010 | A | * | 4/1934 | Dieschber | F16K 17/26 |
| | | | | | 137/460 |
| 1,987,819 | A | * | 1/1935 | Charles | G05D 16/166 |
| | | | | | 137/220 |
| 3,945,393 | A | * | 3/1976 | Teatini | F16K 31/38 |
| | | | | | 137/220 |
| 5,622,201 | A | * | 4/1997 | Chang | F16K 1/12 |
| | | | | | 251/291 |
| 9,683,668 | B2 | * | 6/2017 | Ringer | F16K 11/048 |
| 2010/0187462 | A1 | * | 7/2010 | Davies, Jr. | F16K 47/02 |
| | | | | | 251/318 |

* cited by examiner

Primary Examiner — Angelisa L. Hicks
(74) Attorney, Agent, or Firm — Armstrong Teasdale LLP

(57) ABSTRACT

The present disclosure relates to a differential pressure driven burst-pipeline emergency blocking system. The system includes a valve body with flanges on opposite axial ends, a cylindrical valve sleeve connected with the inner wall of a flange end and having a through-hole in the valve sleeve wall. The wall of the valve sleeve is in movable fit with a valve spool having a U-shaped section. The working fluid through-hole in the valve sleeve is communicated with the inner chamber of the valve body and can be closed by a cylindrical surface of the valve spool. A horizontal push rod is in movable fit with a central hole at the left end of the valve spool, and opposite ends of the horizontal push rod are in movable fit with axial orifices of left and right support seats in the valve body respectively.

3 Claims, 7 Drawing Sheets

DIFFERENTIAL PRESSURE DRIVEN BURST-PIPELINE EMERGENCY BLOCKING SYSTEM

CROSS REFERENCE TO RELATED APPLICATIONS

This patent application claims the benefit and priority of Chinese Patent Application No. 202210632345.3 filed on Jun. 7, 2022, the disclosure of which is incorporated by reference herein in its entirety as part of the present application.

BACKGROUND

The present disclosure relates to an emergency device for automatically blocking the pipeline when blasting occurs during fluid transmission.

In known automatic cut-off protection devices, the cut-off protection is activated by means of an external power source and sensitive control signals. Consequently, the function of emergency shutdown will be disabled when the external power source and the control signals are missing e.g. due to war, accident, disaster, or information destruction. The existing automatic cut-off protection device cannot provide protection for forward or backward blasting during storage, transportation, and process control of the pressurized pipeline; cannot allow fast manually-assisted cut-off and locking on site; cannot display the operating pressure status of the system on site, cannot transmit, to an superior system, the normal operating pressure of the device and pressures in upstream and downstream burst pipelines; cannot send out alarm signals of blasting and emergency blocking at the same time; and is devoid of a differential pressure driven emergency blocking system for balancing and emptying the upstream and downstream pipelines after the burst pipeline is repaired and recovered.

BRIEF DESCRIPTION

The present disclosure provides a differential pressure driven emergency blocking system with a simple structure. The system does not need any external power sources and external input signals, it can be actuated by the energy of the fluid system itself, and allows to realize protection against forward and backward blasting during storage, transportation, and process control of the pipeline, to manually cut off and lock the system on site, to display the operating pressure status of the system on site, and to transmit, to a superior system, the normal operating pressure of the device and pressures in pipelines upstream and/or downstream of the device, and can simultaneously send out alarm signals about the blasting of the pipeline and the emergency blocking of burst-pipeline. The system can balance and empty the upstream and downstream pipelines when the pipeline is repaired and recovered after blasting.

The disclosure is realized by:

A differential pressure driven burst-pipeline emergency blocking system, which includes a valve body provided with flanges on both ends of its horizontal axis; and a cylindrical valve sleeve open at both ends, the right end of which is connected with an inner wall of a right flange end, and forms the only channel at the right end of the valve body, a working fluid through-hole is formed in the wall of the valve sleeve; a valve spool is in movable fit with the valve sleeve wall and has a U-shaped section, the working fluid through-hole in the valve sleeve is communicated with the inner chamber of the valve body and can be closed by the cylindrical surface of the valve spool; a horizontal push rod 8 is in movable fit with a central hole in the vertical surface of the left end of the valve spool, both ends of the horizontal push rod are respectively in movable fit with axial orifices in the vertical surfaces of left and right support seats in the valve body; a right limit block is rigidly connected with the horizontal push rod and located on the right of the vertical surface of the right support seat; a left limit block is rigidly connected with the horizontal push rod and located on the left of the vertical surface of the valve spool, the rigidly connected left limit block at the left end of the horizontal push rod is used to manually lock the valve spool closed by the differential pressure in a stably closed position, or when the closing driven by differential pressure fails, the left limit block can be operated with a handle in emergency to push the valve spool to move rightwards to a position in which the working fluid through-hole in the valve sleeve is blocked; and the rigidly connected right limit block at the right end of the horizontal push rod is used to limit left movement of the horizontal push rod; a spring surrounds the horizontal push rod between the left side of the vertical surface of the right support seat and the right side of the vertical surface of the valve spool; at the working fluid inlet end of the valve body, a cylinder perpendicular to the horizontal push rod is arranged, the inner cavity of the cylinder is in movable fit with a slide bar, the lower end of the slide bar is located within the valve body and hinged with the upper end of a crank; the lower end of the crank is hinged with the horizontal push rod; the upper end of the slide bar is provided with a handle, which is in movable fit with an axial groove on the wall of the cylinder and lockingly matched with a horizontal groove on the wall of the cylinder; at each of the left and right ends of the valve body, a micro-power wireless pressure transmitter is disposed to display the operating pressure status of the device on site, the transmitter has batteries as power supply, and transmits, to an superior system, wireless signals regarding the normal operating pressure of the valve body, the pressure in burst pipeline upstream of the valve body, and the pressure in burst pipeline downstream of the valve body, and simultaneously sends out an alarm signal of emergency blocking of burst pipeline; left and right flange ends of the valve body are respectively provided with an interconnected pore of left chamber and an interconnected pore of right chamber, a connecting valve is provided in the middle of a connecting pipe of left-to-right chamber, and left and right discharge pipes are provided on both ends of the connecting valve; the left and right discharge pipes are respectively provided with an air escape valve of left chamber, an air outlet of left chamber, an air escape valve of right chamber, and an air outlet of right chamber; one or more valve bodies are installed in series in a multi-stage serial pipeline system having upstream and downstream pipelines in the same or opposite directions.

A differential pressure driven burst-pipeline emergency blocking system, which includes a valve body with two flanges on opposite ends of an horizontal axis; a cylindrical valve sleeve open at both ends, the right end of which is connected with the inner wall of a right flange end, and forms the only channel at the right end of the valve body; a working fluid through-hole formed in the wall of the valve sleeve; a valve spool having a U-shaped section and being in movable fit with the wall of the valve sleeve; the working fluid through-hole in the valve sleeve is communicated with the inner chamber of the valve body and can be closed by a cylindrical surface of the valve spool; a horizontal slide bar being in movable fit with the center of a vertical surface at the left end of the valve spool, the ends of which rod are matched with axial orifices in the vertical surface of left and right support seats within the valve body respectively; a spring surrounds the horizontal slide bar between the left side of the vertical surface of the right support seat and the right side of the vertical surface of the valve spool; a right limit block of the horizontal slide bar being located on the right of the vertical surface of the right support seat; a left limit block of the horizontal slide bar being located on the left of the vertical surface of the left support seat; left and right ends of the valve body are respectively provided with a micro-power wireless pressure transmitter for displaying the operating pressure status of the device on site, the transmitter has batteries as power supply, and transmit, to an superior system, wireless signals regarding the normal operating pressure of the device, the pressure in the burst pipeline upstream of the valve body, and the pressure in the pipeline downstream of the valve body, and meantime sends out an alarm signal of emergency blocking of burst pipeline; left and right flange ends of the valve body are respectively provided with an interconnected pore of left chamber and an interconnected pore of right chamber, a connecting valve is provided in the middle of a connecting pipe of left-to-right chamber, and left and right discharge pipes are provided on both ends of the connecting valve; the left and right discharge pipes are respectively provided with an air escape valve of left chamber & an air outlet of left chamber, and air escape valve of right chamber & an air outlet of right chamber; one or more valve bodies are installed in series in a non-reverse flow pipeline.

A differential pressure driven burst-pipeline emergency blocking system, which includes a valve body with two flanges on opposite ends of an horizontal axis; a cylindrical valve sleeve, the left and right ends of which are connected with inner walls on left and right ends of the valve body, and form the only channels of left and right flange ends; working fluid through-holes being provided on walls at both ends of the valve sleeve, and the valve sleeve walls are in movable fit with two symmetrical U-shaped valve spools which are connected via a central shaft, the working fluid through-holes in the valve sleeve being communicated with a bidirectional fluid channel of the inner chamber of the valve body and can be closed by cylindrical surfaces of the valve spools; the central shaft is fixedly connected with the valve spools at their centers; a left horizontal push rod is in movable fit with axial orifices in first and second left supports in the left end of the valve body; and a right horizontal push rod is in movable fit with axial orifices of first and second right supports in the right end of the valve body; the first and second supports are provided with working fluid through-holes communicated with the inner cavity of the valve sleeve and left and right valve body cavities, and the two first supports have symmetrical U-shaped sections; two ends of a first spring are respectively sleeved on an outward extending end of a central shaft of the valve spool and on the left horizontal push rod in the U-shaped cavity of a first left support; when a positive flow differential pressure drives a left valve spool to move leftward to close the working fluid through-hole at the left end of the valve sleeve, and then the right horizontal push rod is pushed, by means of a right manual power-assisting handle, to bear against the right extending end of the central shaft, so as to achieve a locked state, or if the closing driven by differential pressure fails, the horizontal push rod is pushed in emergency, by means of the right power-assisting handle, to bear against the right extending end of the central shaft of the valve spool, and then the left valve spool 1 is moved leftward to lock the closing; both ends of the second spring are respectively sleeved on a right extending end of the central shaft of the valve spool and on the right horizontal push rod in the U-shaped cavity of the first right support; when the reverse flow differential pressure drives the right valve spool to move rightward to close the working fluid through-hole at the right end of the valve sleeve, and then the left horizontal push rod is pushed, by means of the manual left power-assisting handle, to bear against the left extending end of the central shaft of the valve spool to lock the closing, or if the closing driven by differential pressure fails, the left horizontal push rod is pushed in emergency, by means of the left power-assisting handle, to bear against the left extending end of the central shaft of the valve spool, and then the right valve spool is pushed to move rightward to lock the closing; both ends of the valve body are provided with cylinders perpendicular to the horizontal push rod, and the inner cavity of the cylinder is in movable fit with a slide bar; the lower end of the slide bar is located within the valve body and hinged with the upper end of a crank; the lower end of the crank is hinged with the horizontal push rod, and the upper end of the slide bar is provided with a handle, which is in movable fit with an axial groove on the wall of the cylinder and is lockingly matched with a horizontal groove on the wall of the cylinder; the left and right horizontal push rods on both sides of the crank are provided with left and right limit blocks, a first and a second left limit blocks are rigidly connected with the left horizontal push rod, and a first and a second right limit blocks are rigidly connected with the right horizontal push rod; the left and right ends of the valve body are respectively provided with a micro-power wireless pressure transmitter for displaying the operating pressure state of the valve body on site; the transmitter has batteries as power supply, and transmit, to a superior machine, wireless signals regarding the normal operating pressure of the valve body, the pressure in the burst pipeline upstream of the valve body, and the pressure in the pipeline downstream of the valve body, and meantime sends out an alarm signal of emergency blocking of burst pipeline; the left and right flange ends of the valve body are respectively provided with an interconnected pore of left chamber and an interconnected pore of right chamber, a connecting valve is provided in the middle of a connecting pipe of left-to-right chamber, and a left and a right discharge pipe are provided on both ends of the connecting valve; the left and right discharge pipes are respectively provided with an air escape valve of left chamber & an air outlet of left chamber, and an air escape valve of right chamber & an air outlet of right chamber; one or more valve bodies are installed in series in a multi-stage serial pipeline system in the same or reverse direction, respectively.

The advantages of the disclosure are as follows:
1. The present disclosure features a simple structure, in which the spring ensures that the valve body is always open within the allowable flow range.
2. Neither an externally controlled power source nor an external input signal is required, as the differential pressure drive which employs the energy of the fluid system itself enables forward and reverse protections for burst pipeline in storage, transportation and process control system, and there is a quick on-site manual power-assisting cutting and locking device.
3. The quick manual power-assisting structure of the present disclosure can implement independent emergency cut-off, or function as a backup cut-off protection upon the failure of cut-off driven the differential pressure, thus enhancing the reliability and stability of emergency blocking realized by the differential pressure, and meeting the reliability requirement that the first opening after maintenance must be on-site manual opening.

4. When explosion happens at a point G in the system, the devices of the present disclosure disposed upstream and downstream of point G are actuated or cut off by differential pressure, and the manual means facilitate quick cutting and locking to limit the loss and impact to the pipeline segment between points A1 and A2. Even if point G is so close to the device at point A1 or A2 that said device fails to work, it is still possible to automatically provide protection by a device of the same model mounted in series with and at upstream and/or downstream of the device(s) at point A1 or A2, so as to ensure the normal operation of the pipeline with forward and reverse flow pressure sources upstream and downstream of point A1 or A2, limit the loss and impact to the minimum range, and realize a wider range of protection.

5. The transmission for quick manual cut-off on site adopts a crank-link mechanism, which has a faster transmission speed than that of gear rack, screw nut, worm and worm gear used in the prior art, and increases the manual cutting speed by several times.

6. The left and right ends of the valve body are respectively equipped with a micro power wireless pressure transmitter (model: MGTR-S5x71) to display the operating pressure status of the device on site. The transmitter uses batteries as power supply, and transmits, to a superior system, wireless signals regarding the normal operating pressure of the device, a burst pressure of an upstream pipeline of the device, and a burst pressure of a downstream pipeline of the device, and meantime sends out an alarm signal of emergency blocking of burst pipeline.

7. Balance pipes and balance valves are designed at both ends of the device to balance the pressures in upstream and downstream pipeline segments and to remove residues from the pipeline after the burst pipeline is repaired; the two ends of the device are provided with a residue pipe discharge port and a control valve.

8. Three different embodiments are designed to meet different use environments and working conditions.

DETAILED DESCRIPTION

Embodiment 1

Figures 1A, 1B:
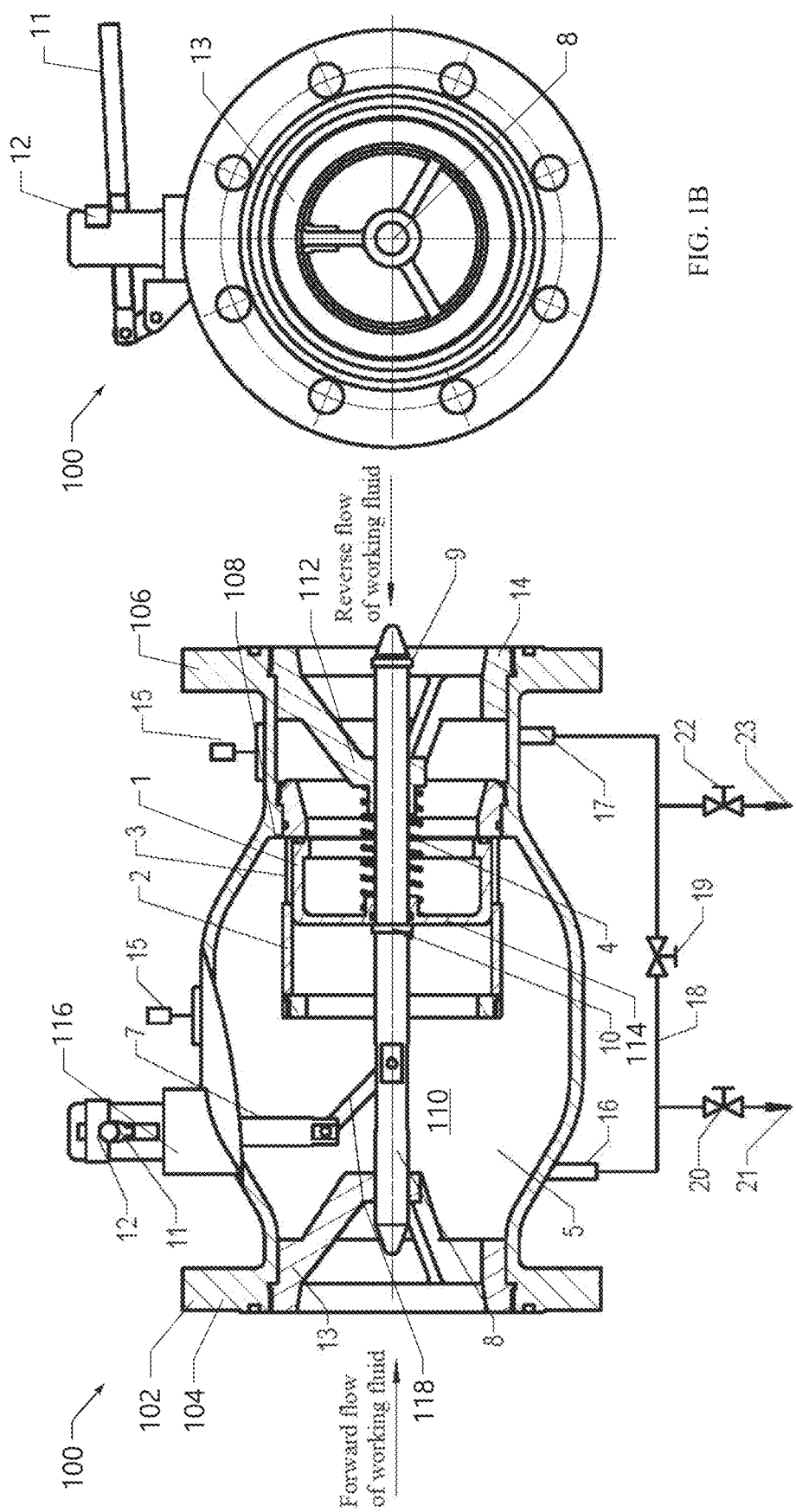
FIG. 1A is a cross-sectional structural diagram of Embodiment 1 according to the present disclosure.
FIG. 1B is an end view structural diagram of Embodiment 1 according to the present disclosure.

As shown in FIGS. 1A and 1B, the system includes a device 100 including a valve body 102 with flanges 104, 106 on opposite ends of a horizontal axis. A cylindrical valve sleeve 2, which is open at both ends, is connected, at its right end, with an inner wall 108 of the right flange 106. The right end of the cylindrical valve sleeve 2 forms the only channel at the right end of the valve body 102. A working fluid through-hole 3 is formed in the wall of the valve sleeve 2, which wall is in movable fit with a valve spool 1 having a U-shaped section. The through-hole 3 in the valve sleeve 2 can be communicated with an inner chamber 110 of the valve body 102, and can be closed by a cylindrical surface of the valve spool 1. A horizontal push rod 8 is in movable fit within an axial orifice formed in the left end of the valve spool 1 and located at the center of a vertical plane. The ends of the horizontal push rod 8 are respectively in movable fit within axial orifices through vertical surfaces of left and right support seats 13, 14 in the valve body 102. A right limit block 9 of the horizontal push rod 8 is positioned on the right side of the vertical surface 112 of the right support seat, and a left limit block 10 of the horizontal push rod 8 is positioned on the left side of the vertical surface 114 of the valve spool 1. A spring 4 surrounds the horizontal push rod 8, and extends between the left side of the vertical surface 112 of the right support seat and the right side of the vertical surface 114 of the valve spool 1.

A cylinder 116 perpendicular to the horizontal push rod 8 is arranged at a working fluid inlet end of the valve body. The inner cavity of the cylinder is in movable fit with a slide bar 7. The lower end of the slide bar 7 extends into the valve body 102 and is articulated with an upper end of a crank 118, the lower end of which crank 118 is articulated with the horizontal push rod 8. The upper end of the slide bar 7 is provided with a handle 11, which is movably fitted within an axial groove and lockably fitted within a horizontal groove 12 on the wall of the cylinder.

The device 100 of the present disclosure can be driven by differential pressure and is suitable for providing emergency cut-off protection when blasting occurs in the fluid transmission pipeline of a unidirectional flow working system. The protection device 100 is provided with a manually operated quick cutting and locking mechanism.

Figure 2:
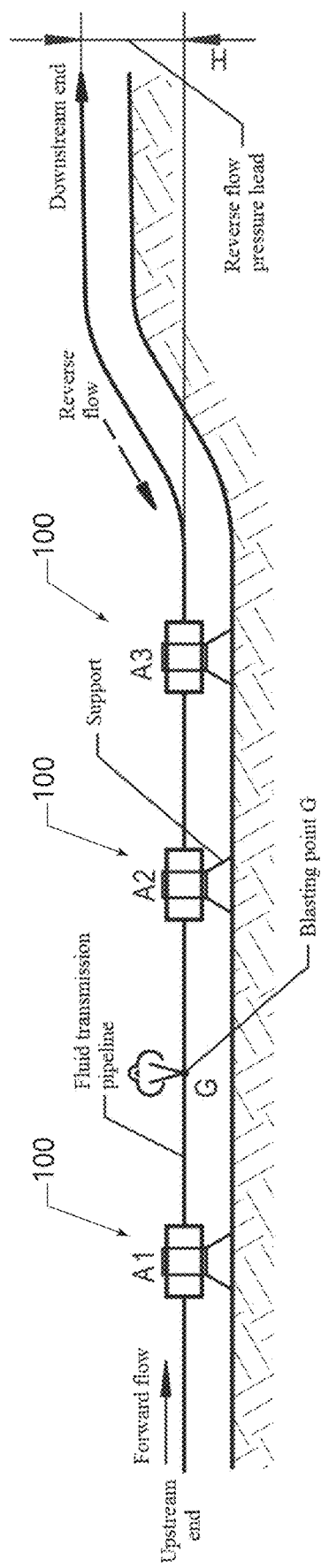
FIG. 2 is an arrangement structure diagram of Embodiment 1 according to the present disclosure.

For a unidirectional flow system in which the fluid is unidirectionally transmitted, in case that the pipeline downstream of the present device 100 bursts, a pressure difference will be generated between upstream and downstream ends of the device 100 and forces the valve spool 1 to move to the right end, thus the valve sleeve hole 3 is closed and the forward flow is cut off, the upstream working fluid is prevented from continuously discharging to the downstream breakage. To prevent the pressure fluctuation and vibration in upstream and downstream systems caused when the device is closed from affecting the sealing of the closure, and to ensure the reliability of the cut-off, a manual handle 11 for quick cut-off and a locking means 12 are disposed on the site for ensuring reliable closing. During normal operation, the manual cut-off handle 11 and the locking means 12 are inactive, so as to ensure that the differential pressure driven cut-off without an external power and control signal takes precedence over the manual quick cut-off and locking. The manual quick assisting structure can also be used as a backup protection in case of failure of the pressure differential driven cut-off. Referring now to FIG. 2, in the normal operation of the forward flow system, when bursting occurs at point G of the pipeline between points A1 and A2 at which points the cutting devices are installed, the pressure differential driven cut-off performed by the cutting device at point A1 takes precedence, and the manual quick assisting cutting and locking is also applied to stop discharge of the forward flow at blasted point G in time. To prevent downstream working fluid from flowing to the blasted point G and being discharged under reverse pressure generated by the working fluid in downstream pipeline and by the topography, the manual quick cut-off and locking means are applied in an emergency to close the device at point A2, thus ensuring that the loss caused by the bursting of pipeline is limited between points A1 and A2.

In order to balance the pressures between left and right ends of the device and to restore the normal working state after the burst pipeline is repaired, the device includes an interconnected pore of left chamber 16, an interconnected pore of right chamber 17, a connecting pipe of left-to-right chamber 18, and a connecting valve of left-to-right chamber 19. The valve 19 is normally closed, and can be opened when the pressure balance is required. After the burst pipeline is repaired, non-polluted water and gas are released to the atmosphere or rivers via the interconnected pore of left chamber 16 and interconnected pore of right chamber 17. If the water and gas are harmful, they will be discharged to sealed containers. The device further includes an air escape valve of left chamber 20, an air escape valve of right chamber 22, an air outlet of left chamber 21, and an air outlet of right chamber 23. The valves 19, 20, 22 are all closed when the device is in normal operation.

If the pipeline bursts, micropower wireless pressure transmitters (model: MGTR-S5x71) mounted at left and right ends of the valve body will display the operation pressure status of the device on the site. The pressure transmitters have batteries as power supply, and transmit, to a superior system, wireless signals regarding the normal operating pressure of the device, the pressure in burst pipeline upstream of the device, and the pressure in burst pipeline downstream of the device, and simultaneously send out alarm signals for emergency blocking of burst pipeline. This is helpful for decisive handling by the superior system, and storing data for post-accident analysis. For example, when the left end gauge/transmitter shows normal pressure, while the right end gauge shows that the pressure drops rapidly to nearly zero "0", this means that an explosion has happened to the downstream pipeline. When the right end gauge shows normal pressure, while the left end gauge shows that the pressure drops rapidly to nearly zero "0", this means that an explosion has happened to the upstream pipeline.

FIGS. 1A and 1B show the device 100 of the present disclosure in the closed state after the downstream pipeline bursts. The spring 4 is compressed by the differential pressure, the valve spool 1 is pushed to move rightward, and the valve sleeve hole 3 is closed so as to cut off the discharge to the downstream breach. At the same time, the manual handle 11 is closed and locked.

The differential pressure driven burst-pipeline emergency blocking device 100 shown in FIG. 1 (provided with a manual assisted closing and locking means) is adapted to a unidirectional flow system.

FIG. 2 is a diagram of a unidirectional flow system with differential pressure driven burst-pipeline emergency blocking devices 100.

It illustrates emergency cut-off protection state of the device 100, which is installed in the unidirectional flow system, after a blasting occurs at point G of the pipeline, which is located between points A, B where devices 100 of the present disclosure are arranged.

FIG. 2 is a schematic diagram of the system to which the device 100 (including the quick manual assisted cut-off and locking means) is applied.

A1: Site A1 where the device 100 of the present disclosure is arranged.

A2: Site A2 where the device 100 of the present disclosure is arranged.

A3: Site A3 where the device 100 of the present disclosure is arranged.

G: Position G where the blasting occurs.

Function of point A1: At the moment an explosion occurs at point G downstream of point A1, being driven by passive pressure difference, the device 100 at A1 is closed in time to prevent the forward flow from being continuously discharged to the break port G, and at the same time, quick manual assisted cut-off and locking can be applied.

Function of point A2: When an explosion occurs at point G upstream of point A2, quick manual assisted cut-off and locking is applied to prevent the reverse flow from being continuously discharged to the break port G.

Effect: The influence of blasting at point G is limited between points A1 and A2 of the pipeline.

Embodiment 2

Figure 3:
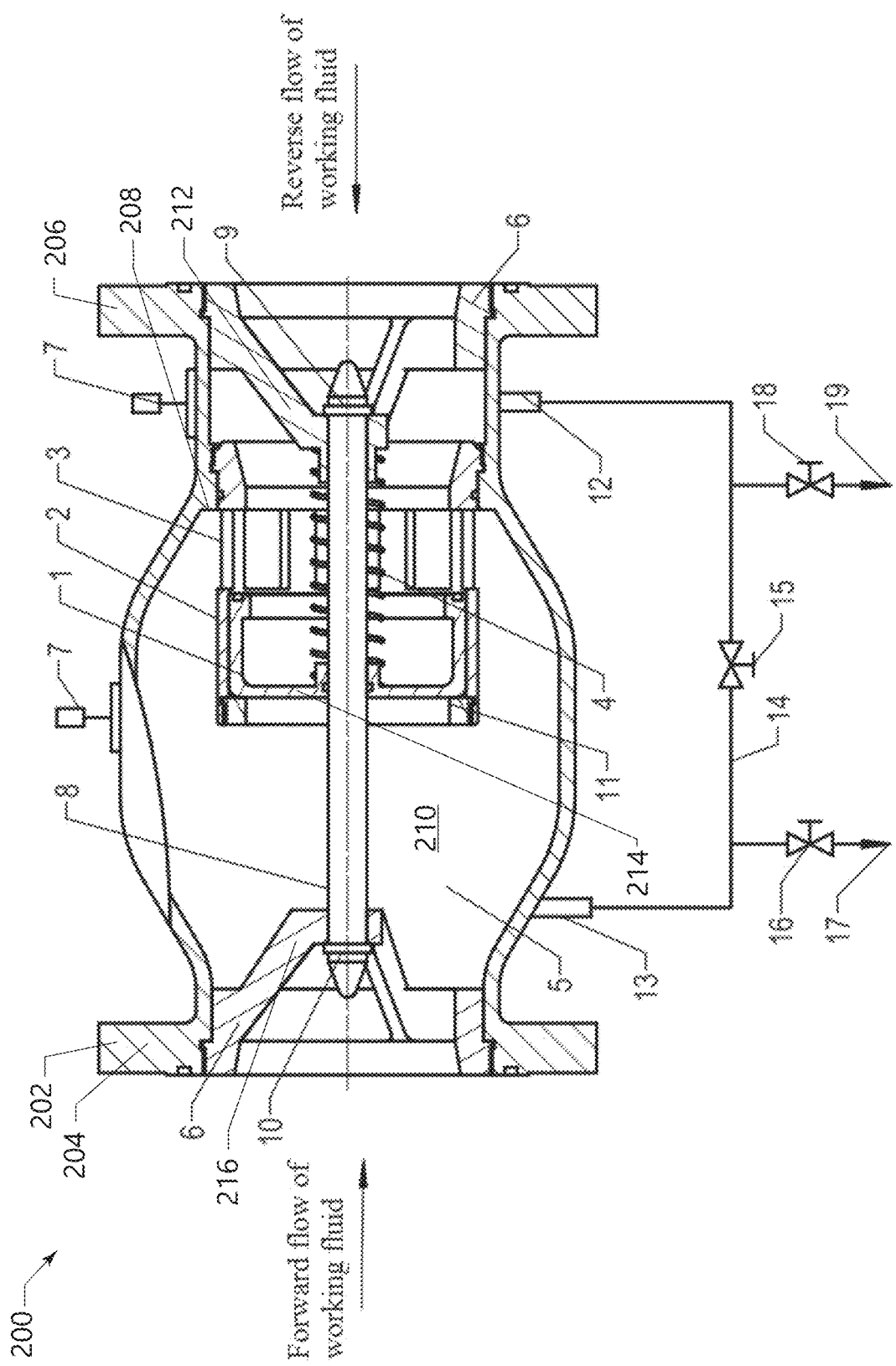
FIG. 3 is a structural diagram of Embodiment 2 according to the present disclosure.

Referring to FIG. 3, differential pressure driven burst-pipeline emergency blocking system includes a device 200 including a valve body 202 with flanges 204, 206 on opposite ends of a horizontal axis. A cylindrical valve sleeve 2, which is open at both ends, is connected, at its right end, with the inner wall 208 of the right flange 206. The right end of the cylindrical valve sleeve 2 forms the only channel at the right end of the valve body 202. A working fluid through-hole 3 is formed in the wall of the valve sleeve 2, which wall is in movable fit with a valve spool 1 having a U-shaped section. The through-hole 3 in the valve sleeve 2 is connected with an inner chamber 210 of the valve body, and can be closed by a cylindrical surface of the valve spool 1. A horizontal push rod 8 is in movable fit within an axial hole formed in the left end of the valve spool 1 and located at the center of a vertical plane. The ends of the horizontal push rod 8 are respectively in movable fit within axial orifices through vertical surfaces of left and right support seats 6 in the valve body. A spring 4 surrounds the horizontal push rod 8, and is located between the left side of the vertical surface 212 of the right support seat 6 and the right side of the vertical surface of the valve spool 1.

A right limit block 9 of the horizontal push rod 8 is positioned on the right side of the vertical surface 212 of the right support seat 6, and a left limit block 10 of the horizontal push rod 8 is positioned on the left side of the vertical surface 216 of the left support seat 6.

The device 200 of the present disclosure is suitable for the emergency cut-off of flow in a system in which the fluid is unidirectionally transmitted and the pressure is continuously stable. The device 200 can provide unidirectional protection by means of differential pressure in a pipe network or a fluid control system with stable forward flow and positive pressure, at the terminal of a fluid control system, or in a system without the action of reverse flow. The left and right ends of the valve body are respectively provided with a micro power wireless pressure transmitter (model: MGTR-S5x71) to display the operation pressure status of the device on the site. The pressure transmitter has battery as power supply, and can transmit, to a superior system, wireless signals regarding the normal operating pressure of the device 200, the pressure in burst pipeline upstream of the device 200, and the pressure in burst pipeline downstream of the device 200, and simultaneously send out an alarm signal for emergency blocking of burst pipeline. This is helpful for decisive handling by the superior system, and storing data for post-accident analysis. For example, when the left end gauge shows normal pressure, while the right end gauge shows that the pressure drops rapidly to nearly zero "0", this means that an explosion has happened to the downstream pipeline. When the right end gauge shows normal pressure, and the left end gauge shows that the pressure drops rapidly to nearly zero "0", this means that an explosion has happened to the upstream pipeline. In order to repair the burst pipeline so as to balance the pressures between pipeline segments upstream and downstream of the device and to remove residues from the pipeline, balance pipes and balance valves are arranged at both ends of the device 200. A residue discharge pipe and a control valve are arranged at each end of the device 200, so as to discharge the non-polluted water and gas to the atmosphere or rivers, and discharge harmful water and gas into sealed containers.

FIG. 3 shows a stable operation state of the device 200 according to the present disclosure in unidirectional fluid transmission. The spring 4 and the valve spool 1 are in the open state, and the through-hole 3 in the valve sleeve 2 is in the fully open position to allow the fluid flow smoothly to downstream pipeline. When the downstream pipeline is exploded, the pressure difference compresses the spring 4 through the valve spool 1, then the valve spool 1 is pushed to move rightward, and the through-hole 3 is closed so as to cut off the discharge to the downstream breach. The reliable and lasting stable pressure in the upstream ensures continuous and reliable cut-off.

FIG. 3 shows a differential pressure driven burst-pipeline emergency blocking device 200 for the unidirectional flow.

Figure 4:
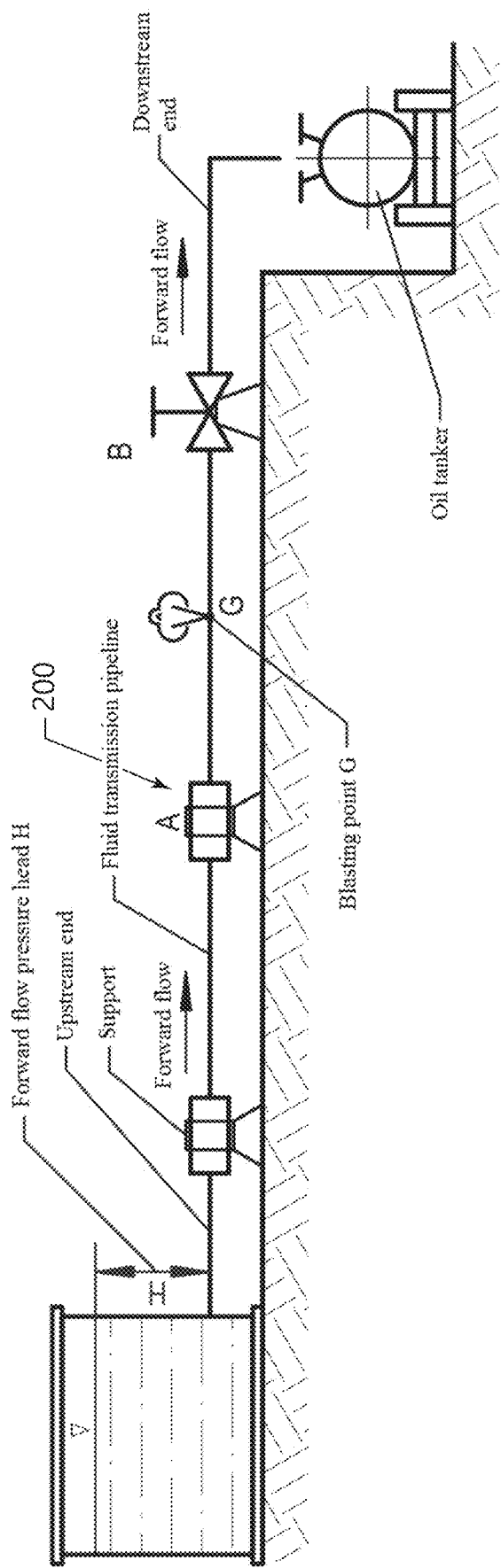
FIG. 4 is an arrangement structure diagram of Embodiment 2 according to the present disclosure.

FIG. 4 is a diagram of a differential pressure driven emergency blocking system of a unidirectional flow.

It shows the system application with a unidirectional flow having continuous and stable pressure but without a reverse flow.

A: Point A where the device 200 of the present disclosure is arranged.

B: Point B where the application terminal is arranged.

G: Position G where the blasting happens.

At the moment an explosion happens at the downstream point G, the differential pressure activates the device 200 at A to cuts off the flow of fluid in time, so as to prevent forward flow from being continuously discharged to the blasting port G.

Function of point B: After an explosion happens at point G upstream of point B, the end user can stop operation of the system because no fluid transmission is needed. At this time, although no reverse flow is generated, the device at point B should still be closed and should not be used until it is repaired.

Effect: The impact of blasting at point G is controlled between A and B of the pipeline.

Embodiment 3

Figures 5A, 5B:
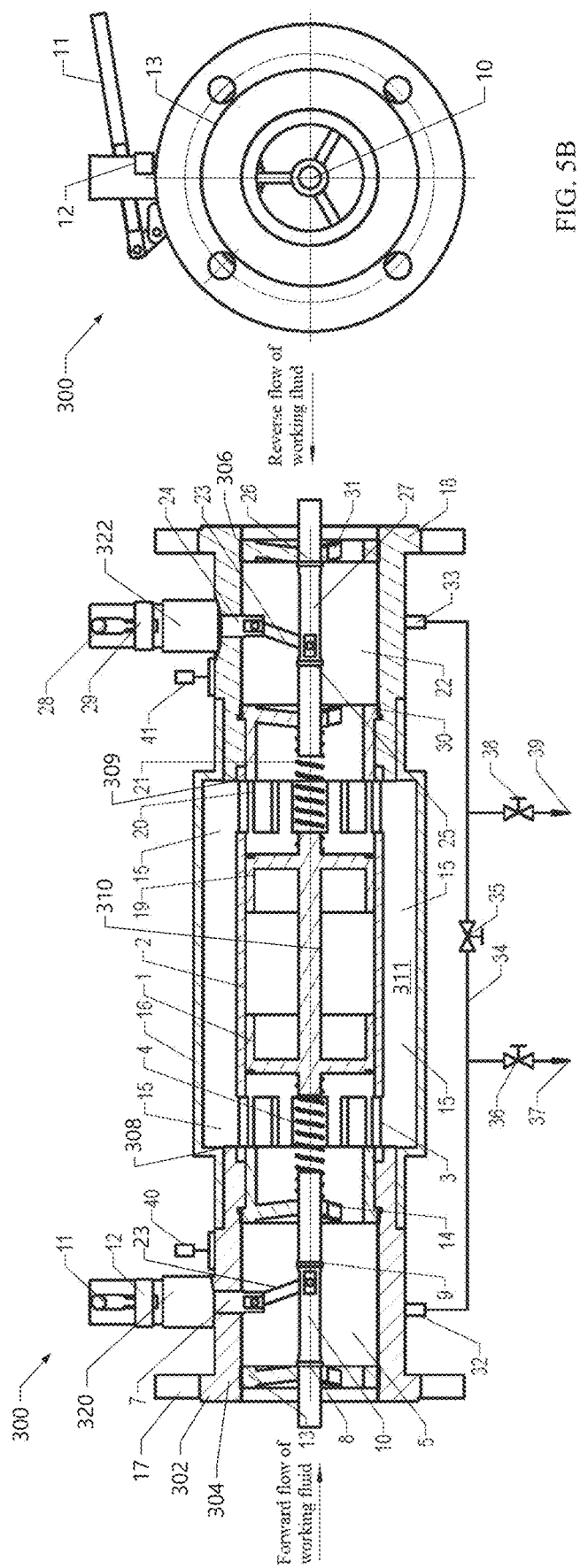
FIG. 5A is a cross-sectional structural diagram of Embodiment 3 according to the present disclosure.
FIG. 5B is an end view structural diagram of Embodiment 1 according to the present disclosure.

Referring to FIGS. 5A and 5B, a differential pressure driven burst-pipeline emergency blocking device 300, which includes a valve body 302 with flanges 304, 306 on both ends of a horizontal axis; a cylindrical valve sleeve 2, the left and right ends of which are connected with inner walls 308, 309 of left and right ends of the valve body 302, and form the only channels of left and right flange ends; working fluid through-holes 3, 20 are formed in walls at both ends of the valve sleeve 2, and the valve sleeve walls are in movable fit with two symmetrical U-shaped valve spools 1, 19 which are connected via a central shaft 310, the working fluid through-holes 3, 20 in the valve sleeve 2 are communicated with a bidirectional fluid channel of within the inner chamber of the valve body 311 and can be closed by a cylindrical surface of the valve spool 1; the central shaft 310 is fixedly connected to the surface of the valve spool 1 at its center; a left horizontal push rod 10 is in movable fit with axial orifices of first and second supports 14, 13 at the left end of the valve body, and a right horizontal push rod 27 is in movable fit with axial orifices of first and second supports 30, 31 at the right end of the valve body; the first and second supports 13, 14, 30, 31 are provided with axial holes communicated with the inner cavity 311 of the valve sleeve 2 and left and right valve body cavities 5, 22, and the two first supports 14, 30 are symmetrical and U-shaped in section; the opposite ends of a first spring 4 are respectively sleeved on an outward extending end of the central shaft 310 of the valve spool 1 and on the left horizontal push rod 10 in a U-shaped cavity of the first left support 14. The ends of the second spring 21 are respectively sleeved on an outward extending end of the central shaft 310 of the valve spool 1 and on a right horizontal push rod 27 in the U-shaped cavity of the first right support 30.

At opposite ends of the valve body, cylinders 320, 322 perpendicular to the horizontal push rod 10, 27 are provided. The inner cavity of the cylinder 320, 322 is in movable fit with a slide bar 7, 24. The lower end of the slide bar 7, 24 is located in the valve body 302 and hinged with the upper end of a crank 23. The lower end of the crank 23 is hinged with the horizontal push rod 10, 27. The upper end of the slide bar 7, 24 is provided with a handle 11, 28, which is in movable fit with an axial groove on the wall of the cylinder 320, 322 and is lockingly matched with a horizontal groove 12, 29 on the wall of the cylinder 320, 322. At either side of the crank 23, the horizontal push rod 10, 27 is provided with left and right limit blocks 8, 9 or 25, 26. At either of the left and right ends of the valve body 302, a micro power wireless pressure transmitter (model: MGTR-S5x71) is disposed to display the operation pressure status of the device on the site. The transmitter uses batteries as power supply, and transmits, to a superior system, wireless signals regarding the normal operating pressure of the device 300, the burst pressure in upstream pipeline of the device 300, and the burst pressure in downstream pipeline of the device 300, and meantime sends out an alarm signal of emergency blocking of burst pipeline. This is helpful for decisive handling by the superior system, and storing data for post-accident analysis. For example, when the left end gauge shows the normal pressure, while the right end gauge shows that the pressure drops rapidly to nearly zero "0", this means that an explosion has happened to the downstream pipeline. When the right end gauge shows the normal pressure, while the left end gauge shows that the pressure drops rapidly to nearly zero "0", this means that an explosion has happened to the upstream pipeline. At the left and right flange ends of the valve body, an interconnected pore of left chamber and an interconnected pore of right chamber are respectively disposed. A connecting valve is provided in the middle of a connecting pipe of left-to-right chamber, and left and right discharge pipes are provided on both ends of the connecting valve. The left and right discharge pipes are respectively provided with an air escape valve of left chamber, an air outlet of left chamber, an air escape valve of right chamber, and an air outlet of right chamber.

The burst-pipeline protection device 300 driven by bidirectional flow pressure difference is provided with a bidirectional manual assisting quick closing and locking mechanism.

The bidirectional flow differential pressure driven blasting protection device 300 of the present disclosure provides reliable bidirectional emergency cut-off protection for the system for pipeline transmission of annularly supplied fluid and the process control pipeline system that must be provided with bidirectional flows.

Differential pressure drive+quick manual assistance+locking+pressure signal display+system balance (bidirectional protection).

FIGS. 5A and 5B show an emergency blocking device 300 for burst pipeline driven by bidirectional flow pressure difference (including bidirectional quick manual assisting cutting and locking).

FIGS. 5A and 5B show the device 300 in unloaded state, in which the left spring 4 and the right spring 21 are in symmetrical balance, the left valve spool 1 and the right valve spool 19 are in the neutral position, and the left through-hole 3 and the right through-hole 20 of the valve sleeve are in the open position, making passage for the circulation of forward or reverse flow.

When the forward flow at the upstream end passes through at the designed normal flow, the fluid is transmitted to the downstream pipeline of the device 300 through the right valve chamber 22, the right through-hole 20, the bidirectional fluid channel 15, the left through-hole 3 of the valve sleeve, and the left valve chamber 5. The thrust produced by differential pressure between both ends of the device 300 cannot overcome the thrust of the left spring 4 during normal flow, the left through-hole 3 of the valve sleeve is always open, and the system is in normal operation. In case of explosion of pipeline at the downstream of the device 300, the flow rate rises instantaneously, causing the pressure difference between the right valve spool 19 and the left valve spool 1 to increase suddenly. The differential pressure pushes the left valve spool 1 to move leftward against the thrust of the left spring 4, closes the left through-hole 3 of the valve sleeve to cut off the device 300. In order to prevent continuous discharge to the blasting port, and to prevent the pressure fluctuation and vibration of the upstream and downstream systems from affecting the closed seal after the pipeline blasting device 300 is closed, the right power-assisting closing handle 28 and the lock 29 of the left power-assisting closing handle are immediately used to realize quick manual assisting cutting and locking, and ensure the reliability of the device 300.

When the reverse flow occurs at the downstream, the fluid is transmitted to the pipeline upstream of the device 300 through the left valve chamber 5, the left through-hole 3 of the valve sleeve, the bidirectional fluid channel 15, the right through-hole 20, and the right valve chamber 22. During normal flow, the differential pressure thrust at both ends of the device 300 cannot overcome the thrust of the right spring 21, the right through-hole 20 is always open and the system is in normal operation. When a pipeline burst occurs in the upstream of the device 300, the flow rate rises instantaneously, causing the pressure difference between the left valve spool 1 and the right valve spool 19 to increase suddenly. The differential pressure pushes the right valve spool 19 to move rightward against the thrust of the right spring 21, and closes the right through-hole 20 to cut off the device 300. In order to prevent continuous discharge to the blasting port, and to prevent the pressure fluctuation and vibration of the upstream and downstream systems from affecting the closed seal after the pipeline blasting device 300 is closed, the left power-assisting closing handle 11 and the lock 12 of the right power-assisting closing handle are immediately used to realize quick manual assisting cutting and locking, and ensure the reliability of the device 300.

Figure 6:
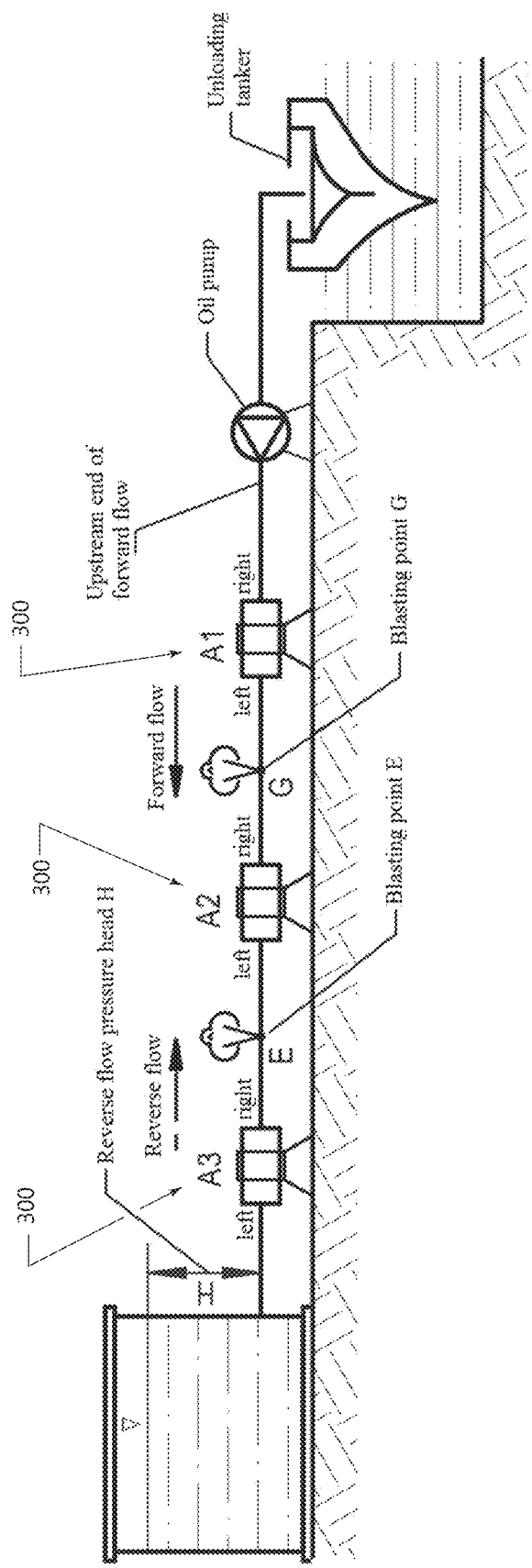
FIG. 6 is an arrangement structure diagram of Embodiment 3 according to the present disclosure.

FIG. 6 is a diagram of differential pressure driven emergency blocking system of a bidirectional flow.

A1: Site A1 where the device 300 of the present disclosure is arranged.

A2: Site A2 where the device 300 of the present disclosure is arranged.

A3: Site A3 where the device 300 of the present disclosure is arranged.

G: Position G where the blasting happens.

E: Position E where the blasting happens.

Function of point A1: At the moment an explosion happening at point G downstream of point A1, being driven by pressure difference, the valve spool on the left end of the device 300 at A1 is cut off in time to prevent the forward flow from being continuously discharged to the blasting port G, and at the same time, quick manual assisting cut-off and locking is applied.

Function of point A2: At the moment an explosion occurring at point G upstream of point A2, being driven by pressure difference, the reverse flow cuts off the valve spool at the right end of the device 300 at A2 in time to prevent the reverse flow from being continuously discharged to the blasting port G, and at the same time, quick manual assisting cut-off and locking is applied.

Function of point A3: The damage and influence at the blasting point E is limited between A2 and A3 of the pipeline; the fast and reliable blocking ensures the safety of the oil tank.

Reverse flow: It is derived from the fluid capacity in the pipeline and the potential energy generated by the trend of the pipeline downstream of the blasting point. The process control system is designed with an inherent reverse pressure flow; the annular heating, water supply, gas supply, and oil supply systems are designed with allowable reverse flows.

Effect

1) The device 300 of the present disclosure realizes the burst pipeline protection totally driven by differential pressure (driven by the energy of the system itself) in the bidirectional flow pipeline system, and simultaneously realizes the quick bidirectional manual assisting cutting and locking, which improves the stability and reliability of the differential pressure driven pipeline blasting protection device 300.

2) The device 300 of the present disclosure ensures that the damage and influence of the blasting at point G are limited between A1 and A2 of the pipeline, and ensures the normal operation of the pipeline with forward flow source upstream of point A1, and ensures the normal operation of the pipeline with reverse flow source downstream of point A2.

3) The device 300 of the disclosure ensures that the damage and influence of the blasting at point E are limited between A2 and A3 of the pipeline, and the fast and reliable blocking ensures the safety of the oil tank.

4) The manual quick cut-off and locking system of the present disclosure enhances the reliability and stability of the differential pressure drive, and meets the reliability requirement that the first opening after maintenance must be manual on site.

5) The present disclosure displays on site the operation status, the normal operation pressure of wireless signal transmission, the upstream pipeline burst pressure, and the downstream pipeline burst pressure, and sends out the alarm signal of pipeline burst emergency blocking. This is helpful for decisive handling by the upper-level system, and saving data for post-accident analysis.

Comparative analysis on arrangement between embodiment 3 of the present disclosure and a similar system of the prior art.

Figure 7:
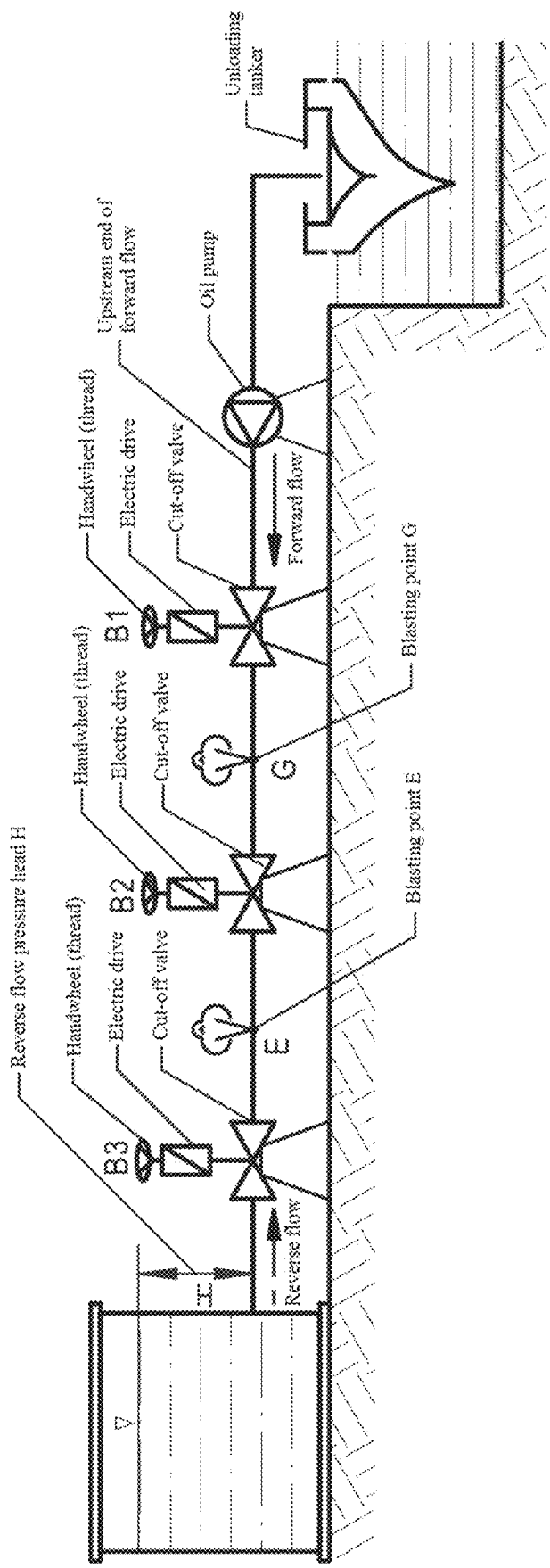
FIG. 7 is an arrangement structure diagram of a similar system in the prior art (the arrangement structure diagram of a system similar to the one in Dalian suffered XX major accident on Jul. 16, 2010).

As shown in FIG. 7,

1. Brief description of a similar system in the prior art, i.e. the complex system of Dalian XX major accident on Jul. 16, 2010: according to the reports from xinhuanet and other media, "on Jul. 16, 2010, a misoperation occurred to the Dalian XX oil tanker during the oil unloading, resulting in a fire due to the leakage of crude oil from the pipeline, and giving rise to a burst of pipelines at the corridor and explosion of two pipelines (900 mm, 700 mm). The 105 m3 oil tank was burnt out, and the fire was completely extinguished on July 18." Equipment for storing and transporting oil, gas, and toxic, flammable, explosive, and radioactive media are prone to leakage. If we do not take careful precautions, similar accidents are still likely to occur.

(1) The oil pipeline from the beginning of oil unloading to the inlet of the oil tank shall be equipped with three-stage cut-off devices, i.e. a stop valve at the pump outlet, an emergency cut-off valve, and a stop valve at the inlet of the oil tank. As shown in FIG. 7, the explosion at B1, B2, and B3 started from the pump outlet. Under normal conditions, the electric closing time of the electric stop valve is 2-5 minutes, and the manual closing time is 5-10 minutes. If the electric stop valve is closed totally manually after power loss, it cannot cut off the stream transiently, and the explosion will extend rapidly.

(2) The oil tank will burn down only if the three-stage cut-off valves B1, B2, and B3 all fail. The power loss of the electric cut-off valve and emergency cut-off valve due to fire failed the electric closing, and closing the shut-off valve at the inlet of the oil tank merely by turning the manual wheel spent more than ten hours. The manual closing couldn't completely block the explosion due to the slow speed and the high temperature deformation, resulting in the collapse of the last line of defense. The burning oil flow ignited a 100,000 m3 oil tank.

(3) Although the reservoir area was provided with an export pump house, an independent fire water supply ring pipe network, a fixed oil-tank sprinkler system, and a fixed foam fire extinguishing system, they did not work due to the fire and power loss (without power source).

2. Embodiment 3 of the differential pressure driven pipeline blasting emergency blocking system of the present disclosure can overcome the shortcomings of the prior art.

(1) The oil pipeline from the beginning of oil unloading to the inlet of the oil tank shall be equipped with three-stage differential pressure driven pipeline blasting emergency blocking devices at the pump outlet, the pipe middle section, and the oil tank inlet respectively. Referring to A1, A2, and A3 in FIG. 6, if the explosion starts from the pump outlet of the oil unloading ship, it shall be subjected to three-stage differential pressure driven cut-off and three-stage quick manual assisting cut-off and locking. In each stage, the transient differential pressure interrupts the flow, and then locks with zero leakage. It is impossible for the explosion to extend to the oil tank through three-stage blocking.

(2) In the differential pressure driven burst-pipeline emergency blocking device as shown in FIG. 6, the oil tank will burn down only if the three-stage cut-off valves A1, A2, and A3 all fail. The pump outlet, pipe middle section, and oil tank inlet are all provided with differential pressure driven automatic cut-off and three-stage quick manual assisting cut-off and locking. The pressure differential driven cut-off is very quick, lasting for only 0.8-5 seconds, and the time for quick assisting cut-off and locking is 5-10 seconds. This reliable system features quick closing, can prevent the spreading of explosive flow in time, and control the damage and impact to the minimum.

(3) The response speed of differential pressure driven emergency blocking is the advantage, the quick manual assisting cut-off and locking structure is the advantage of backup protection, and the differential pressure driven transient interruption of flow and the quick manual backup protection ensure the reliability of emergency blocking.

What is claimed is:

1. A differential pressure driven burst-pipeline emergency blocking system comprising:

a valve body with flanges on opposite ends of a horizontal axis;

a cylindrical valve sleeve open at both ends, the right end of which is connected with an inner wall of a right flange end and forms the only channel at the right end of the valve body, wherein a working fluid through hole is formed in the wall of the valve sleeve;

a valve spool with a U-shaped section in movable fit with the valve sleeve wall, wherein the working fluid through hole in the valve sleeve is communicated with an inner chamber of the valve body and can be closed by a cylindrical surface of the valve spool;

a horizontal push rod in movable fit with a central hole in a vertical plane at the left end of the valve spool, wherein both ends of the horizontal push rod are respectively in movable fit with axial orifices in the vertical surface of left and right support seats within the valve body;

a right limit block rigidly connected with the horizontal push rod and located on the right of the vertical surface of the right support seat;

a left limit block rigidly connected with the horizontal push rod and located on the left of the vertical surface of the valve spool, wherein the rigidly connected left limit block at the left end of the horizontal push rod is used to manually lock the valve spool closed by the differential-pressure in a stably closed position, or when the closing driven by differential pressure fails, the left limit block is operated with the help of a handle in an emergency to push the valve spool to move rightwards to a position in which the working fluid through hole in the valve sleeve is blocked, and the rigidly connected right limit block at the right end of the horizontal push rod is used to limit left movement of the horizontal push rod;

a spring surrounding the horizontal push rod and located between the left side of the vertical surface of the right support seat and the right side of the vertical surface of the valve spool;

at the working fluid inlet end of the valve body, a cylinder perpendicular to the horizontal push rod;

a slide bar is movably fitted within the inner cavity of the cylinder, wherein the lower end of the slide bar extends in the valve body and is hinged with the upper end of a crank, and wherein the lower end of the crank is hinged with the horizontal push rod;

a handle is mounted at the upper end of the slide bar, which is in movable fit within an axial groove on the wall of the cylinder and in lockable fit within a horizontal groove on the wall of the cylinder; and at each of left and right ends of the valve body, a micro-power wireless pressure transmitter to display an operating pressure status of the device on site, wherein the transmitter has batteries as a power supply, and transmits, to a superior system, wireless signals regarding the normal operating pressure of the valve body, the pressure of burst pipeline upstream of the valve body, and the pressure of burst pipeline downstream of the valve body, and also sends out an alarm signal of emergency blocking of burst-pipeline;

wherein the left and right flange ends of the valve body are respectively provided with an interconnected pore of a left chamber and an interconnected pore of a right chamber;

wherein a connecting valve is provided in the middle of a connecting pipe of the left and right chambers; and wherein left and right discharge pipes are provided on both ends of the connecting valve, the left and right discharge pipes are respectively provided with an air escape valve of the left chamber, an air outlet of the left chamber, an air escape valve of the right chamber, and an air outlet of the right chamber; and wherein one or more valve bodies are installed in series in a multi-stage serial pipeline system in the same or reverse direction.

2. A differential pressure driven burst-pipeline emergency blocking system comprising:

a valve body with flanges on opposite ends of a horizontal axis;

a cylindrical valve sleeve open at both ends, the right end of which is connected with the inner wall of a right flange end and forms the only channel at the right end of the valve body, wherein a working fluid through hole is formed in the wall of the valve sleeve;

a valve spool with a U-shaped section in movable fit with the valve sleeve wall, wherein the working fluid through hole in the valve sleeve is communicated with the inner chamber of the valve body and can be closed by a cylindrical surface of the valve spool;

a horizontal slide bar movably fitted within the center of a vertical surface of the left end of the valve spool, wherein opposite ends of the horizontal slide bar are in movable fit with axial holes in vertical surfaces of left and right support seats in the valve body respectively;

a spring surrounding the horizontal slide bar and located between the left side of the vertical surface of the right support seat and the right side of the vertical surface of the valve spool;

a right limit block for the horizontal slide bar located on a right side of the vertical surface of the right support seat, and a left limit block of the horizontal slide bar located on a left side of the vertical surface of the left support seat; and at each of left and right ends of the valve body, a micro-power wireless pressure transmitter to display an operating pressure status of the device on site, wherein the transmitter has batteries as a power supply, and transmits, to a superior system, wireless signals regarding the normal operating pressure of the device, the pressure of burst pipeline upstream of the valve body, and the pressure of the burst pipeline downstream of the valve body, and also sends out an alarm signal of emergency blocking of burst-pipeline;

wherein the left and right flange ends of the valve body are respectively provided with an interconnected pore of a left chamber and an interconnected pore of a right chamber;

wherein a connecting valve is provided in the middle of a connecting pipe of the left and right chambers;

wherein left and right discharge pipes are provided on both ends of the connecting valve, the left and right discharge pipes are respectively provided with an air escape valve of the left chamber, an air outlet of the left chamber, an air escape valve of the right chamber, and an air outlet of the right chamber; and wherein one or more valve bodies are installed in series in a non-reverse flow pipeline.

3. A differential pressure driven burst-pipeline emergency blocking system comprising:

a valve body with flanges on opposite ends of a horizontal axis extending longitudinally along the valve body;

a cylindrical valve sleeve, wherein the cylindrical valve sleeve includes left and right ends that are connected with inner walls of respective left and right ends of the valve body, wherein the left and right ends of the cylindrical valve sleeve form the only channels into the left and right flanges of the valve body, wherein working fluid through-holes are provided on end walls located at opposite ends of the cylindrical valve sleeve, wherein the wall of the cylindrical valve sleeve is in movable fit with two symmetrical valve spools which are U-shaped and connected via a central shaft, wherein the working fluid through-holes in the cylindrical valve sleeve are in communication with a bidirectional fluid channel within an inner chamber of the valve body and can be closed by cylindrical surfaces of the valve spools, and wherein the central shaft is fixedly connected with the valve spools at the center of their surfaces;

a left horizontal push rod in movable fit with axial holes defined through first and second left supports, the first and second left supports located proximate the left end of the valve body; and a right horizontal push rod in movable fit with axial holes defined through first and second right supports, the first and second left supports located proximate the right end of the valve body;

wherein working fluid through-holes of the first and second supports are in communication with the inner cavity of the cylindrical valve sleeve as well as left and right valve body cavities, and the two first supports are symmetrical and respectively in U-shape;

wherein a first spring has two ends respectively sleeved on an outward extending end of the central shaft of the valve spool and on the left horizontal push rod within the U-shaped cavity of the first left support, and functions to lock the working fluid through hole in the left end of the cylindrical valve sleeve in a state that it is closed by the left end of the cylindrical valve sleeve having been moved leftward by positive flow differential pressure, together with the right horizontal push rod bearing against the right extending end of the central shaft of the valve spool by means of a right manual power-assisting handle, or, if the closing activated by differential pressure fails, closed in emergency by moving the left valve spool leftward using the right horizontal push rod bearing against the right extending end of the central shaft of the valve spool by means of the right power-assisting handle;

wherein a second spring has two ends respectively sleeved on a right extending end of the central shaft of the valve spool and on a right horizontal push rod within the U-shaped cavity of the first right support, and functions to lock the working fluid through hole in the right end of the cylindrical valve sleeve in a state that it is closed by the right end of the cylindrical valve sleeve having been moved rightward by the reverse flow differential pressure, together with the left horizontal push rod bearing against the left extending end of the central shaft by means of the manual left power-assisting handle, or if the closing activated by differential pressure fails, closed in emergency by moving the right valve spool rightward using the left horizontal push rod bearing against the left extending end of the central shaft of the valve spool by means of a left power-assisting handle;

wherein a cylinder perpendicular to the horizontal push rod is provided at each end of the valve body, the inner cavity of which cylinder is in movable fit with a slide bar;

wherein the lower end of the slide bar is located in the valve body and hinged with the upper end of a crank;

wherein the lower end of the crank is hinged with the horizontal push rod;

wherein the upper end of the slide bar is provided with a handle, which is in movable fit with an axial groove on the wall of the cylinder and is lockingly matched with a horizontal groove on the wall of the cylinder;

wherein the left and right horizontal push rods on both sides of the crank are provided with left and right limit blocks, which include first and second left limit blocks rigidly connected with the left horizontal push rod, as well as first and second right limit blocks rigidly connected with the right horizontal push rod;

wherein the left and right ends of the valve body are respectively provided with a micro-power wireless pressure transmitter to display the operating pressure state of the valve body on site, wherein the transmitter has batteries as a power supply, and transmits, to a superior machine, wireless signals regarding the normal operating pressure of the valve body, the burst pressure in the pipeline upstream of the valve body, and the burst pressure in the pipeline downstream of the valve body, and simultaneously sends out an alarm signal of emergency blocking of burst-pipeline;

wherein the left and right flange ends of the valve body are respectively provided with an interconnected pore of a left chamber and an interconnected pore of a right chamber;

wherein a connecting valve is provided in the middle of a connecting pipe of the left and right chambers;

wherein left and right discharge pipes are provided on both ends of the connecting valve;

wherein the left and right discharge pipes are respectively provided with an air escape valve of the left chamber, an air outlet of the left chamber, an air escape valve of the right chamber, and an air outlet of the right chamber; and wherein one or more valve bodies are installed in series in a multi-stage serial pipeline system in the same or reverse direction.

* * * * *